United States Patent [19]

Panov et al.

[11] 4,066,416

[45] Jan. 3, 1978

[54] CARBONATING TOWER FOR PRODUCING SODIUM BICARBONATE MAGMA

[76] Inventors: Vadim Ivanovich Panov, ulitsa Dzerzhinskogo, 17, kv. 10; Grigory Anatolievich Tkach, ulitsa Frunze, 15, kv. 8; Viktor Mikhailovich Tomenko, ulitsa Kombainovskaya, 13/15, kv. 3, all of Kharkov; Boris Mikhailovich Zolotukhin, ulitsa Kalinina, 11, kv. 19, Krasnoperekopsk Krymskoi oblasti; Erik Konstantinovich Belyaev, Saltovskoe shosse, 157, kv. 128, Kharkov, all of U.S.S.R.

[21] Appl. No.: 671,812

[22] Filed: Mar. 30, 1976

[51] Int. Cl.[2] .......................... B01D 9/02; C01D 7/10
[52] U.S. Cl. .......................................... 23/283; 23/260; 23/265; 423/424; 423/420; 261/113; 261/114 R; 261/114 A
[58] Field of Search ................. 23/283, 284, 260, 265; 423/420, 423, 424, 425; 261/113 R, 114 R, 114 A

[56] References Cited

U.S. PATENT DOCUMENTS 3,551,097  12/1970  Brooks et al. ................. 23/265 X Primary Examiner—James H. Tayman, Jr.
Attorney, Agent, or Firm—Haseltine, Lake & Waters

[57] ABSTRACT

A carbonating tower for the production of sodium bicarbonate magma has a hollow casing accommodating perforated plates arranged one above another which divide the inner space of the casing into a separation compartment and reaction compartments communicating with one another via overflow pipes. Each reaction compartment has an annular baffle coaxial therewith arranged adjacent to the upper end of the overflow pipe, the baffle being adapted to define a zone for accumulation of solid crystalline phase in the magma. There are also provided means for removing said magma from one reaction compartment into the next compartment. The provision of the accumulation zone and the means for removal of magma contributes to the reduction of supersaturation of the solution with sodium bicarbonate, whereby crystals of uniform shape and size are obtained.

3 Claims, 6 Drawing Figures

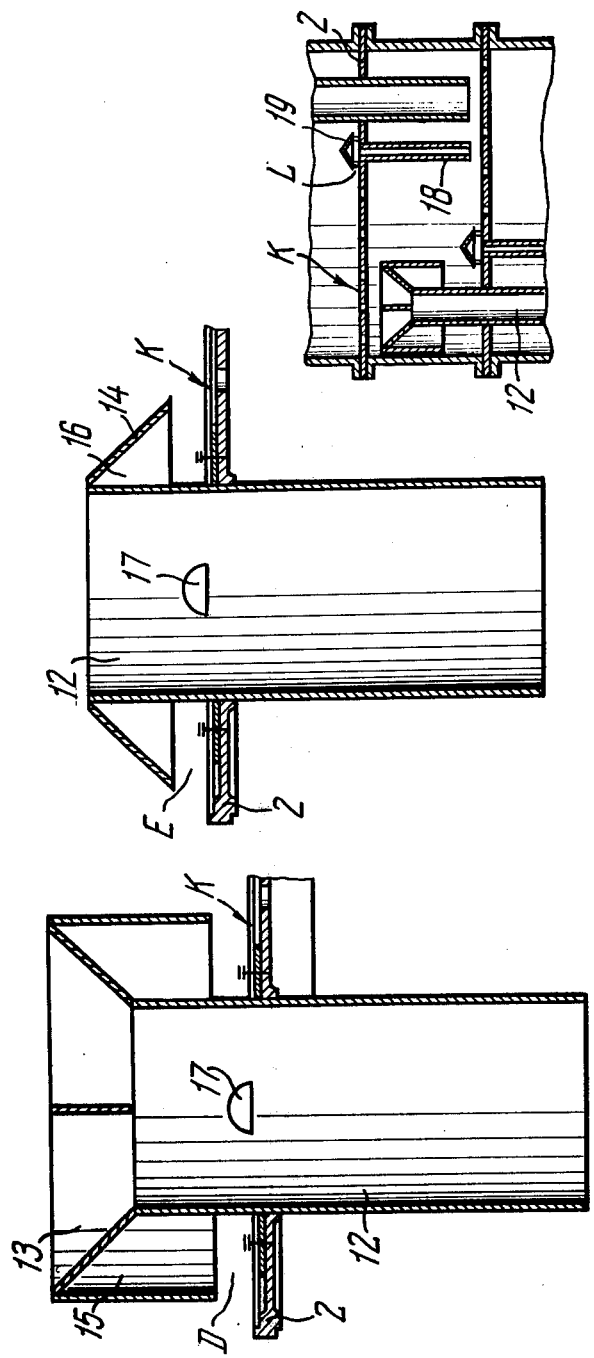

CARBONATING TOWER FOR PRODUCING SODIUM BICARBONATE MAGMA

The invention relates to installations for production of sodium bicarbonate, and in particular to carbonating towers for the production of sodium bicarbonate magma.

The present invention may be the most advantageously used in the production of sodium bicarbonate by absorbing carbon dioxide with ammoniated solution of sodium chloride or with solution of sodium hydroxide. The invention may also prove useful in the production of purified sodium bicarbonate by absorbing carbon dioxide with sodium carbonate solution.

Carbonating towers for the production of sodium bicarbonate magma containing solid crystalline phase are widely known in the art, and these towers comprise a casing having pipes for feeding reactants and for removal of the resultant magma and gas, perforated plates accommodated in the casing which are arranged one above another to divide the inner space of the casing into a separation compartment and reaction compartments arranged thereunder, the last being interconnected by overflow pipes. The upper reaction compartments are absorption compartments and the lower ones are cooling compartments. The cooling compartments have means for cooling the magma. The bottom reaction compartment is arranged under the cooling compartments.

All the absorption compartments are of substantially the same height. The height of each of the cooling compartments is greater than the height of each of the absorption compartments because each of the cooling compartments accommodates means for cooling the magma. All cooling compartments are of the same height.

The perforated plate separating adjacent reaction compartments comprises a flat disc having openings for gas flow. The openings may be of various shape and may be provided with toothed caps for a better distribution of gas in the magma. The arrangement of openings in the perforated plate may also be selected in accordance with various patterns, but the most common is the arrangement thereof along circles concentrical with the perforated plate.

The reaction compartments communicate with one another via overflow pipes for passage of the suspension which are secured in the holes of the plate substantially adjacent to the casing walls. Each overflow pipe is sifted in a horizontal plane with respect to the adjacent pipe so that the suspension in each reaction compartment flows in the horizontal direction.

Each of the cooling compartments has means for cooling the magma which comprise a bundle of pipes in which a cooling liquid circulates. The bottom reaction compartment has pipes for feeding gas and for removing the magma obtained in the tower. A pipe for feeding an ammoniated solution is located in the first reaction compartment from the top so that the ammoniated solution of sodium chloride and gas flow in countercurrent. In the first two-three reaction compartments from the top a supersaturated solution is formed, and solid crystalline phase precipitates in the subsequent reaction compartments.

Precipitation of sodium bicarbonate crystals begins generally in the third reaction compartment from the top, because only at this level of the tower ammoniated solution of sodium chloride contains the amount of sodium bicarbonate which suffices for the beginning of crystallization. The delay in precipitation of crystals in the first two reaction compartments is due to an insufficient supersaturation of the solution. In order that the crystallization may start it is required that the amount of supersaturation achieve a predetermined value (more than 30 g/l of sodium bicarbonate dissolved in liquid phase). This supersaturation is achieved substantially in the third reaction compartment wherein crystals start precipitating.

Supersaturation occurring in the subsequent reaction chambers results in an increase in the crystallization rate, hence, in the formation of a large number of small crystals (smaller than 50 m) having irregular shape. On the contrary, low oversaturation (less than 15 g/l) results in the formation of crystals of uniform size and shape.

In the prior art carbonating tower, gas passes from the bottom up through the openings in the perforated plate at a velocity sufficient to prevent the magma from flowing from one reaction compartment into the other located therebelow through these openings, the gas intensively agitating the magma. At the same time, carbon dioxide contained in the gas reacts with ammoniated solution of sodium chloride. Since the velocity of the gas flowing through central openings of the perforated plate is greater than the velocity of the gas flowing through peripheral openings, the degree of saturation of the suspension with gas and turbulization thereof are higher at the central part of each reaction compartment than at the peripheral part thereof. Thus, a certain accumulation of solid phase on the perforated plate occurs which permits supersaturation of the solution to be lowered only to such inadequate extent that crystals of uniform shape and size cannot be obtained. In addition, accelerated scaling of the perforated plate with solid crystalline phase takes place so that the tower operation should be frequently suspended to wash the tower.

Since crystals are not formed immediately in the first reaction compartment, but rather in the third reaction compartment, a mass-scale uncontrolled crystallization of magma takes place in the third reaction compartment and in those located below thus resulting in the formation of crystals of irregular shape. Therefore, the prior art carbonating tower cannot provide for controlled accumulation, and hence for uniform growth of crystals in the reaction compartments in the course of carbonation.

With considerable increase in the flow rate of reactants and corresponding increase in throughput capacity of the prior art carbonating tower, a more intensive agitation of magma with gas in each reaction chamber takes place so that the accumulation of crystals on the perforated plate is considerably reduced thus increasing non-uniformity of crystals as to the size and shape. With a reduction of the flow rate of reactants, the velocity of gas flowing through the lower decreases to such an extent that it cannot retain the magma on the perforated plate, and the magma leaks through the openings of the plate. Thus the accumulation of crystals on the plate decreases. Therefore, the design of the conventional carbonating tower does not enable variation of its throughput capacity over a wide range.

All the above disadvantages do not allow for obtaining desired uniformity of shape and size of sodium bicarbonate crystals in the conventional carbonating tower, and considerably reducing scaling of the perforated plates with solid crystalline phase so that productivity range of this tower is limited. Non-uniformity of crystals in shape and size results, in turn, in an increased humidity thereof after separation from the magma so that power requirements for subsequent processing of the crystals are increased.

It is the main object of the invention to provide a carbonation process with the formation of crystals of uniform shape and size in the magma.

Another object of the invention is to minimize scaling of perforated plates with solid crystalline phase.

Still another object of the invention is to enlarge technological capabilities of a carbonating tower, that is to provide for variation of its throughput capacity over a wide range.

These and other objects are accomplished by the provision of a carbonating tower for the production of sodium bicarbonate magma including solid crystalline phase, comprising a hollow casing having pipes for feeding reactants and removing the resultant magma and gas, perforated plates accommodated in the inner space of the casing which separate the inner space of the casing into a separation compartment and reaction compartments arranged thereunder communicating with one another via overflow pipes, and means for cooling the magma accommodated in at least one of the lower reaction compartments, wherein, according to the invention, there is provided, substantially in each reaction compartment, an annular baffle located adjacent to the upper end of the overflow pipe coaxially therewith and in a spaced relation thereto, the baffle being adapted to define a zone for accumulation of solid crystalline phase in the magma during carbonation, the portions of each perforated plate adjacent to the overflow pipes are made solid, and there are provided means for removing the magma containing solid crystalline phase accumulated therein arranged substantially below the upper end of the overflow pipe.

This design provides for accumulation of solid crystalline phase substantially in each reaction compartment. The conditions are thereby provided for the formation of crystals of uniform shape and size which facility, in combination with means for removing the magma containing accumulated solid crystalline phase results in considerable reduction of sealing of perforated plates with solid phase. The above features provide for varying the amount of reactants fed to the tower, hence the throughput capacity thereof over a wide range, while retaining high quality of resultant sodium bicarbonate crystals.

In accordance with one embodiment of the invention, means for removing the magma containing solid crystalline phase accumulated therein comprise at least one hole in the wall of the overflow pipe adjacent to the perforated plate.

This embodiment is simple in structure and provides for removing the magma directly from the surface of the perforated plate.

In accordance with another embodiment, means for removing the magma containing solid crystalline phase accumulated therein comprise a pipe secured with the upper end thereof in the perforated plate substantially adjacent to the overflow pipe.

This embodiment is preferably used in the case where the velocity of gas flow in the carbonating tower is insufficient to retain the magma on the perforated plate because the provision of the pipe enables the removal of a part of magma which would otherwise leak through the openings in the perforated plate.

The top reaction compartment preferably is of a height 2-6 times greater than the height of each of the reaction lower compartments.

An increase in the volume of the top reaction compartment compared with the volume of each of the lower reaction compartments results in reduced turbulization in this compartment during carbonation thus providing the conditions for germination of crystals and lowering supersaturation of ammoniated solution of sodium chloride which is favourable for the growth of crystals of uniform shape and size.

The invention will now be described in greater detail with reference to the accompanying drawings, in which:

FIG. 1 diagrammatically shows a vertical section of the carbonating tower according to the invention;

FIG. 2 is an enlarged detail A in FIG. 1;

FIG. 3 is an enlarged detail A in FIG. 1 illustrating another embodiment of the invention;

FIG. 6 is an enlarged detail B in FIG. 5.

Figures 1, 4:
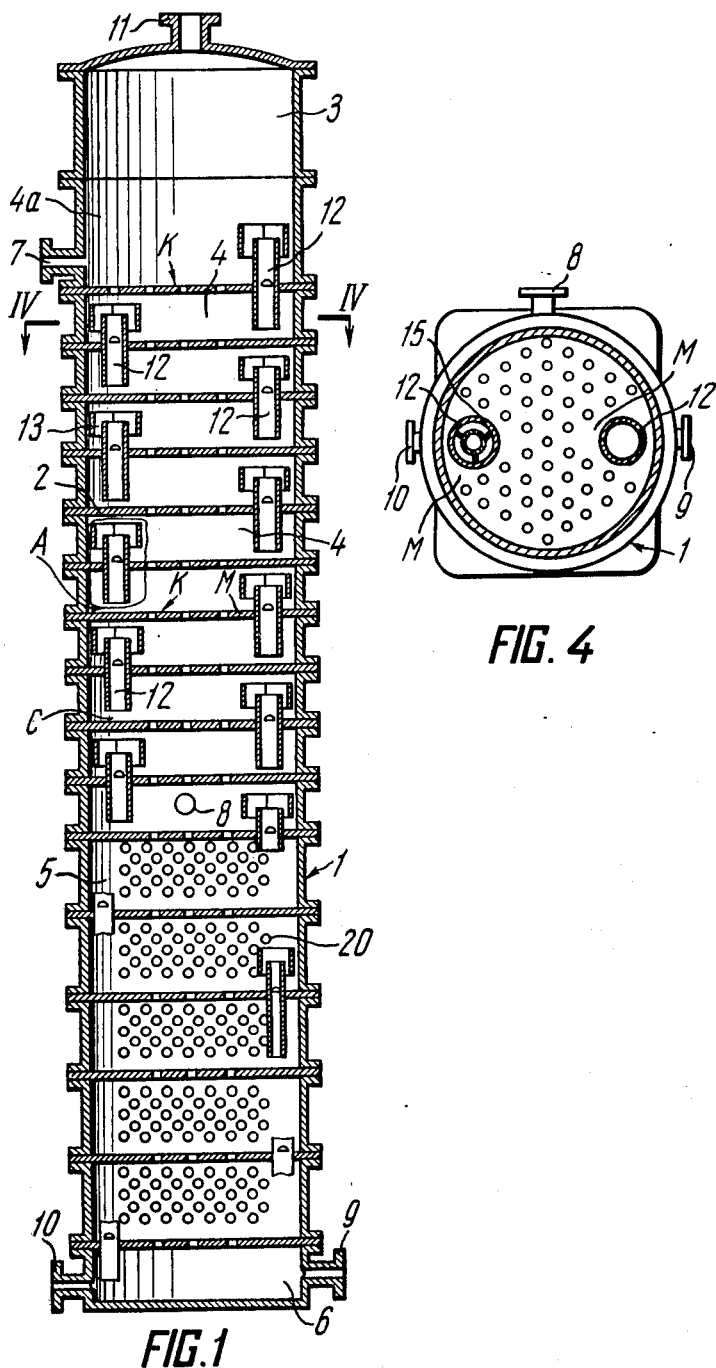
FIG. 4 is a sectional view taken along line IV—IV in FIG. 1.
Figure 5:
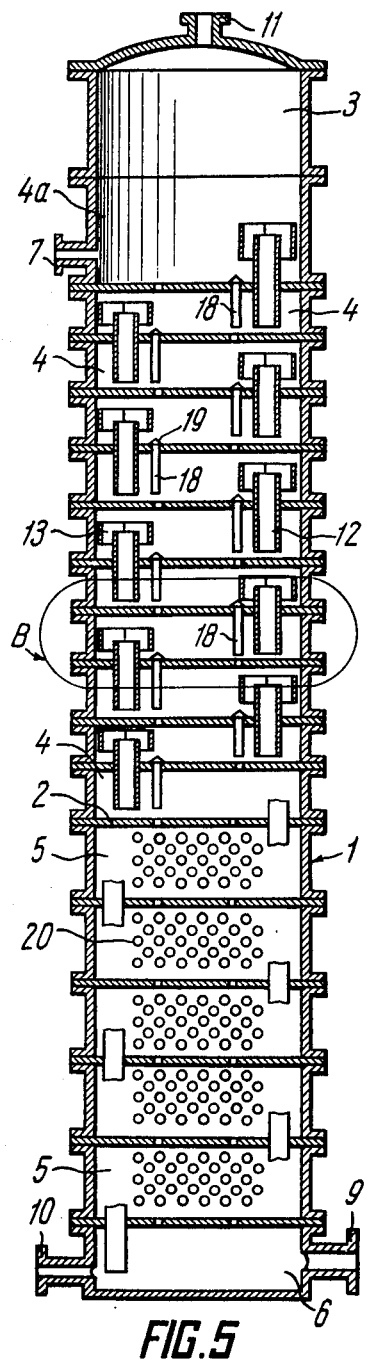
FIG. 5 shows a vertical section of another embodiment of the carbonating tower according to the invention.

The carbonating tower comprises a hollow casing 1 (FIG. 1) accommodating perforated plates 2 arranged above one another which are fixed in any appropriate manner. The perforated plates 2 divide the inner space of the casing 1 into a separation chamber 3 and reaction compartments 4 and 5, wherein the upper compartments 4 are absorption compartments and the lower compartments 5 are cooling compartments. The top absorption compartment 4a is of a height 2-6 times greater than that of each of the lower absorption compartments 4. Each cooling compartment 5 is of a height which is somewhat greater than that of each of the absorption compartments 4. A bottom reaction compartment 6 is accommodated in the bottom portion of the casing 1 under the cooling compartments 5. The casing 1 is provided with pipes 7, 8, 9, 10, 11 for feeding reactants and for removing the resultant magma and gas, respectively. It is noted that the top absorption compartment 4a has the pipe 7, the lower absorption compartment 4 has the pipe 8, the bottom reaction compartment 6 has the pipes 9 and 10 and the separation compartment has the pipe 11.

Each of the reaction compartments 4 and 5 communicates with an adjacent compartment via an overflow pipe 12 which is secured in a hole made in the perforated plate 2 adjacent to the wall of the casing 1.

The axis of each overflow pipe 12 is substantially normal to the plane of the perforated plate 2, and a space "C" of about 100 mm is provided between the lower end of the overflow pipe and the surface of the perforated plate 2 located below.

In addition, the adjacent overflow pipes 12 are diametrically shifted relative to one another in the horizontal plane as shown in FIG. 1.

An annular baffle or shield 13 or 14 (FIG. 2) is mounted coaxially with each overflow pipe 12 adjacent to the upper end thereof, and the shield may have various shapes. Thus, the baffles 13 (FIG. 2) are of cylindrical shape and the baffles 14 (FIG. 3) are tapered. The cylindrical baffle 13 (FIG. 2) is secured to the overflow pipe 12 with a certain radial spacing therefrom by means of at least two ridges 15 (FIGS. 2 and 4). The ratio of outside diameters of the cylindrical baffle 13 (FIG. 2) and overflow pipe 12 is preferably of 1.25 and 2. The upper end between the baffle 13 is arranged over the upper end of the overflow pipe 12 as shown in FIG. 2. The space "D" between the lower end of the cylindrical baffle 13 and the surface "K" of the perforated plate 2 facing this end of the shield is from 1/5 to ⅓ of the amount of projection of the upper end of the overflow pipe 12 from the surface "K".

The tapered baffle 14 (FIG. 3) is also secured to the overflow pipe 12 by means of at least two ridges 16. The upper end diameter of the tapered baffle 14 is equal to the diameter of the overflow pipe 12. The ratio of the lower diameter of the tapered baffle to the diameter of the overflow pipe 12 is preferably equal to 1.25 to 2 so as to provide a desired radial spacing therebetween. The upper ends of the baffle 14 and overflow pipe 12 are at the same level, and the lower end of the baffle 14 is spaced from the surface "K" of the plate 2 with spacing "E" similar to the cylindrical baffle 13 (FIG. 2).

The baffle may also comprise hemispheres with outward camber (not shown).

It should be noted that the portions "M" of the perforated plates 2 adjacent to the overflow pipes 12 (FIG. 4) are made solid.

For removal of the magma containing solid crystalline phase accumulated therein from one reaction compartment 4 or 5 into another, there are provided means for removing magma containing solid crystalline phase accumulated therein, each being arranged substantially below the upper end of the overflow pipe 12 and thereby also below the lower edge of the baffle. Such means is in proximity with the overflow pipe and is adjacent the baffle to receive the magma containing solid crystalline phase accumulated therein. Thus, said means may comprise a hole 17 in the wall of the overflow pipe 12 adjacent to the perforated plate 2 (FIGS. 2, 3). A plurality of such holes may be provided in each overflow pipe 12.

Four holes 17 equally circumferentially spaced along the periphery of the overflow pipe 12 provide the most preferable conditions for magma removal.

The means for removing magma containing solid crystalline phase accumulated therein may comprise a pipe 18 (FIG. 6) secured in the perforated plate 2 adjacent to the overflow pipe 12. The upper end of the pipe 18 is at the same level with the surface "K" of the perforated plate 2 (FIG. 6). The cross-sectional area of the passage of the pipe 18 should be substantially equal to the total cross-sectional area of the holes 17 (FIG. 3).

A conical or hemispherical cap 19 may be mounted over the pipe 18 coaxially therewith (FIG. 6). A space "L" equal to ¼ to ⅓ of the diameter of the pipe 18 is provided between the lower edge of the cap 19 and the surface "K" of the perforated plate 2.

The cooling compartments 5 accommodate means for cooling the magma each comprising a bundle of tubes 20 (FIG. 1) fixed in any appropriate manner and adapted for circulation of a cooling liquid therethrough. The bundles of tubes 20 are arranged in a spaced relation with the baffles 13 or 14 with a spacing at least equal to the diameter of one tube 20.

In accordance with one embodiment of the invention, the baffles 13 or 14 and holes 17 or pipes 18 for removing the magma containing solid crystalline phase accumulated therein may be provided only in the absorption compartments 4.

The above-described carbonating tower operates in the following manner.

Ammoniated solution of sodium chloride is fed to the top absorption compartment 4a via the pipe 7. Gas with a high content of carbon dioxide (75 - 80%) is fed to the bottom reaction compartment 6 via the pipe 9. Gas with a low content of carbon dioxide (35 - 40%) is fed to the bottom absorption 4 via the pipe 8.

The reaction of the ammoniated solution of sodium chloride and carbon dioxide contained in the gas begins in the top absorption compartment 4a with precipitation of crystals of sodium bicarbonate and formation of magma. Due to the fact that the height of the top absorption compartment 4a is greater than that of each absorption compartment 4 therebelow, the gas entering the compartment 4a from the lower absorption compartment 4 agitates the magma formed therein less intensively than in the compartments 4 thereby resulting in reduced supersaturation of the solution. At the same time, since the suspension is relatively still, the value of super-saturation obtained in the top absorption compartment 4a is sufficient for the beginning of precipitation of crystals. Thus, the number of crystal germs formed is relatively small so that the conditions for their growth in the subsequent reaction compartments 4 and 5 are improved.

The magma flows from the top absorption compartment 4a down to the next absorption compartment 4 through the overflow pipe 12. Since the space "C" between the lower end of the overflow pipe 12 and the surface "K" of the perforated plate 2 is small as compared with the total height of the absorption compartment 4, the magma admitted from the top absorption compartment 4a is distributed over the surface of the perforated plate 2 and continues to react with carbon dioxide contained in the gas flowing from the bottom through the openings of the perforated plate 2. The magma flows in the horizontal direction in the absorption compartment 4 towards the overflow pipe 12 which is diametrically shifted relative to the first overflow pipe 12 and which connects this absorption compartment 4 to the next compartment there-below. The magma flows through the overflow pipe 12 to the next absorption compartment 4. Similarly, the magma flows through all subsequent reaction compartments 4 and 5. Therefore, the ascending gas flow reacts with horizontal flow of magma in all reaction compartments 4 and 5 of the carbonating tower.

More favorable conditions for the growth of sodium bicarbonate crystals of uniform shape and size are provided in case where the magma containing germs of these crystals is in a relatively still state. This is obtained by using the annular baffle 13 or 14 the design of which allows for retaining horizontal streams of magma by defining a zone between the baffle 13 and the perforated plate 2 separated from these streams. The provision of solid portions "M" of the perforated plate 2 in this zone prevents the ascending gas from entering this zone. Therefore, there is provided a zone in which the magma containing crystal germs is in a relatively still state which is favorable for the growth of sodium bicarbonate crystals of uniform shape and size with a minimum number of newly formed crystal germs. The crystals are accumulated adjacent to the surface "K" of the perforated plate 2, and the magma with lowered content of solid crystalline phase is ousted from the zone of accumulation of solid crystalline phase with incoming streams of magma and the suspension then ascends to the upper end of the overflow pipe 12 and flows down through this pipe into the lower absorption compartment 4.

The magma containing accumulated solid crystalline phase flows down through the holes 17 (FIGS. 2, 3).

In accordance with second embodiment of means for removing the magma with accumulated solid crystalline phase, the suspension is removed through the pipe 18. If the cross-sectional area of passage of the pipe 18 is greater than the total cross-sectional area of the holes 17, the cap 19 is mounted over the pipe 18 with the space "L" between the lower edge of the cap and the surface "K" of the perforated plate so as to prevent overflow of the entire volume of suspension from one absorption compartment 4 into another through the pipe 18 bypassing the overflow pipe 12.

Therefore, predominantly coarse crystals are removed from each absorption compartment 4 into the lower compartment, whereas fine crystals (smaller than 50μ) remain within the zone for accumulation of solid crystalline phase in the magma and grow therein in relatively undisturbed environment. The presence of magma containing accumulated solid crystalline phase substantially in each of the reaction compartments 4 and 5 provides for reduced super saturation of the solution which is favorable for the growth of sodium bicarbonate crystals with minimum number of newly formed small crystals.

Therefore, the magma is removed from two levels of each reaction compartments 4 or 5: a part of magma with a high content of solid crystalline phase is removed from the surface "K" of the perforated plate 2 and the remaining magma with a low content of solid crystalline phase is removed from the level of the upper end of the overflow pipe 12.

The removal of magma from the surface "K" provides for substantial reduction of scaling of the surface "K" of the perforated plate 2 with solid crystalline phase.

In the absorption compartments 4, the magma is heated due to the heat release in the course of the reaction of ammoniated sodium chloride solution with carbon dioxide. Then the magma is fed to the cooling compartments 5 having bundles of tubes 20 in which a cooling liquid circulates to wash the walls of the tubes 20. The magma is thus cooled, and the carbonation process continues.

Cooled magma is removed from the carbonating tower via the pipe 10.

Unreacted carbon dioxide and gases which do not take part in the reaction pass through the separation compartment 3 and leave the tower through the pipe 11.

Where the baffle 13 is mounted at the level of the upper end of the overflow pipe 12 only to the absorption compartment 4, an increase in the content of solid crystalline phase in the magma in the cooling compartments 5 results only from the continuing reaction between the magma and carbon dioxide. This is possible due to the fact that after the magma leaves the lowest absorption compartment 4, the content of solid crystalline phase in the magma is sufficient for further growth of crystals formed in the absorption compartments 4.

The carbonation process is conducted in the carbonating tower continuously.

Due to the provision of the above-described design of the reaction compartments crystals of sodium bicarbonate of uniform chape and size may be obtained containing up to 70% of the same fraction with humidity below 13.5% at any desired throughput capacity of the carbonating tower.

What is claimed is:

1. A carbonating tower for the production of sodium bicarbonate magma containing solid crystalline phase, comprising: a casing having an inner space; pipes for feeding reactants into and for removing the resultant magma and gas from said casing; perforated plates arranged one above another in the inner space of said casing to divide said inner space of the casing into a separation compartment and reaction compartments arranged one above another below said separation compartment; means for cooling the suspension accommodated in at least one of the lower reaction compartments; overflow pipes mounted on said perforated plates and establishing communication of said separation and said reaction compartments, each of said perforated plates having solid portions adjacent to the overflow pipe; an annular baffle adapted to define a zone for accumulation of solid crystalline phase in the magma, said baffle being connected in each reaction compartment to the upper end of said overflow pipe coaxially therewith and in spaced relation thereto, said baffle encircling said overflow pipe and having a lower edge located above the level of the perforated plate and below the upper end of said pipe and forming an annular space with the overflow pipe and means for removing the magma containing solid crystalline phase accumulated therein which means is arranged in proximity with said overflow pipe and adjacent said baffle and substantially below the lower edge of said baffle.

2. A carbonating tower according to claim 1, wherein said means for removing the magma containing solid crystalline phase accumulated therein comprises at least one hole in the wall of said overflow pipe at the level of said perforated plate.

3. A carbonating tower according to claim 1, wherein the top reaction compartment is of a height 2 – 6 times greater than that of each of the lower reaction compartments.

* * * * *